Figure 1:
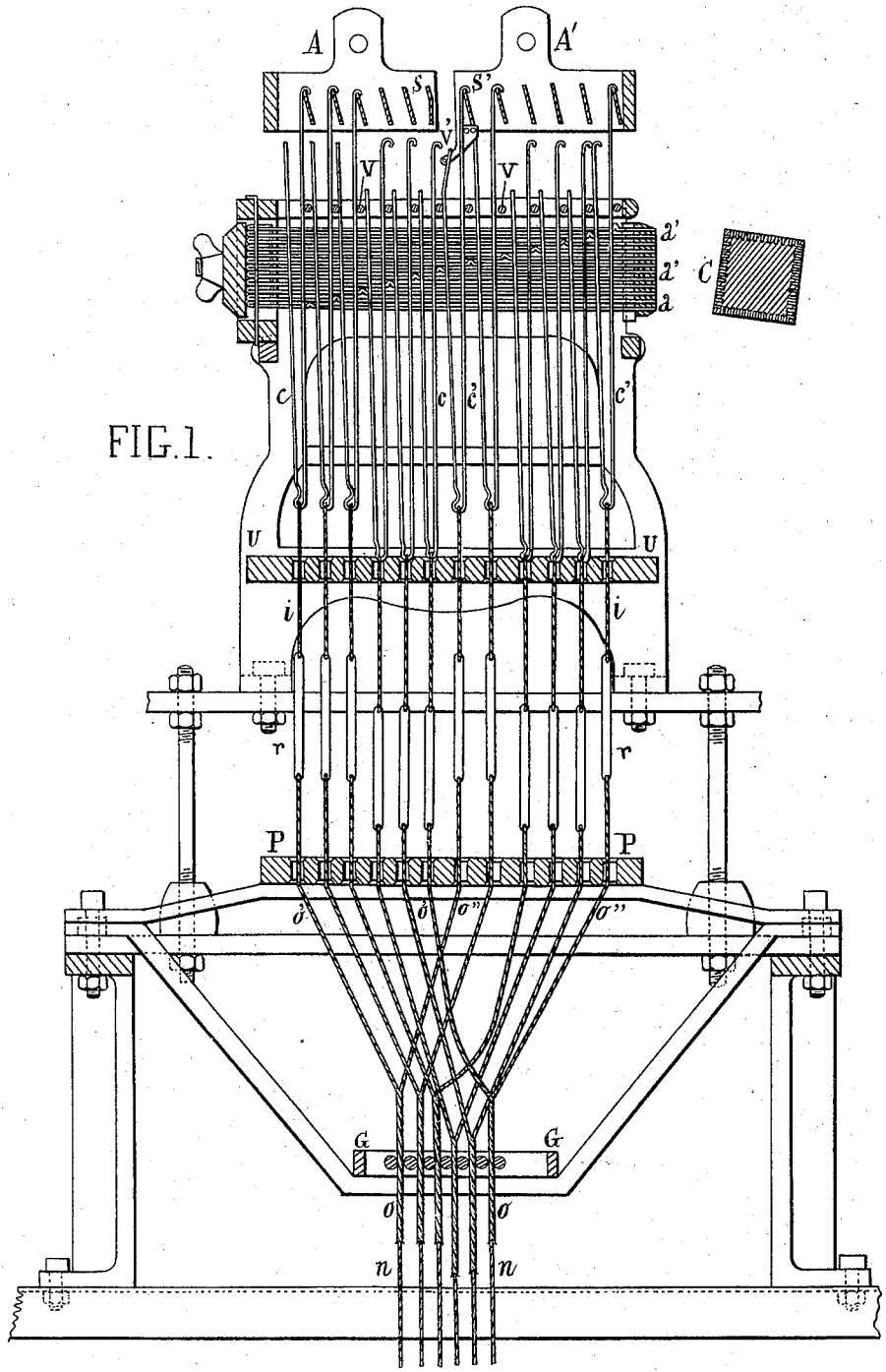

No. 608,037. Patented July 26, 1898.
H. GLORIEUX.
JACQUARD MACHINE FOR LOOMS.
(Application filed Nov. 20, 1897.)
(No Model.) 2 Sheets—Sheet I.

WITNESSES
Carrie Brennan
Grace P. Brereton

INVENTOR
Henry Glorieux
By Geo. P. Whitney

No. 608,037. Patented July 26, 1898.
H. GLORIEUX.
JACQUARD MACHINE FOR LOOMS.
(Application filed Nov. 20, 1897.)
(No Model.) 2 Sheets—Sheet 2.
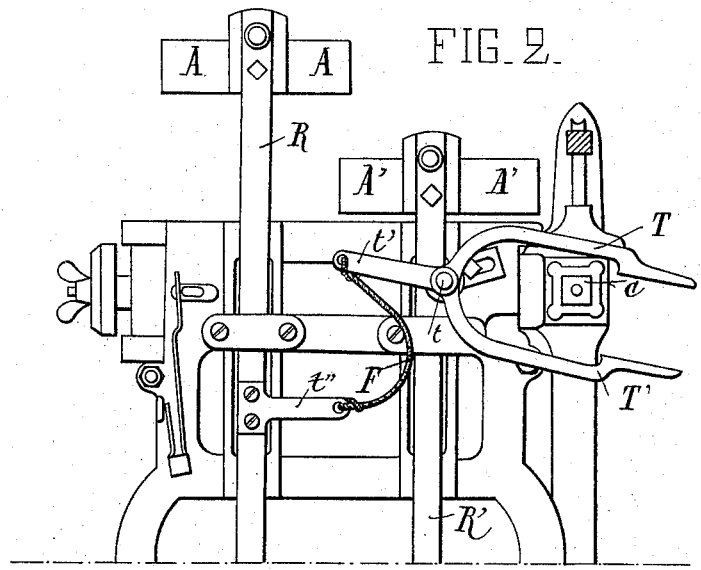
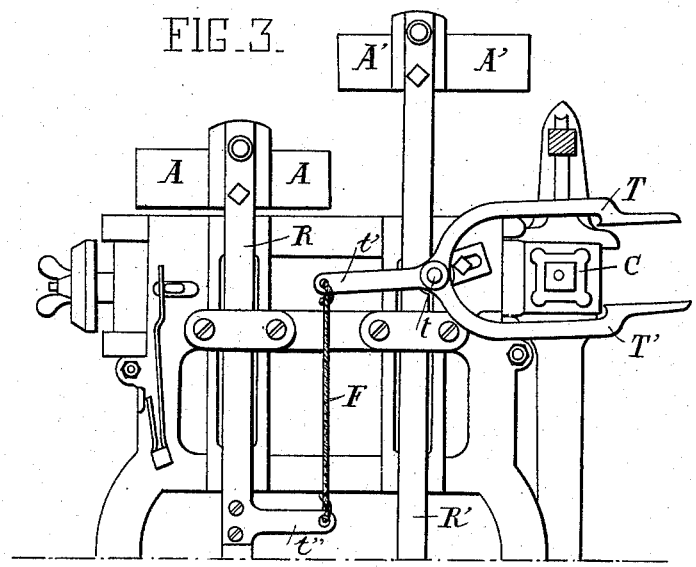
WITNESSES
Carrie Brennan
Grace P. Brewton
INVENTOR
Henry Glorieux
By Geo. W. Whitney
atty.

UNITED STATES PATENT OFFICE.

HENRY GLORIEUX, OF ROUBAIX, FRANCE.

JACQUARD-MACHINE FOR LOOMS.

SPECIFICATION forming part of Letters Patent No. 608,037, dated July 26, 1898.

Application filed November 20, 1897. Serial No. 659,297. (No model.) Patented in France July 9, 1897, No. 268,604, and in England September 28, 1897, No. 22,192.

*To all whom it may concern:*

Be it known that I, HENRY GLORIEUX, engineer, a citizen of the French Republic, residing at Roubaix, in the Department of Nord, France, have invented certain new and useful Improvements in Jacquard-Machines for Looms; and I do hereby declare the following to be a full, clear, and exact description of the invention, such as will enable others skilled in the art to which it appertains to make and use the same.

This invention has been patented in Great Britain, No. 22,192, dated September 28, 1897, and in France, No. 268,604, dated July 9, 1897.

The improvements in jacquard-machines for power-looms to which this invention relates are illustrated by the accompanying drawings, to which reference will hereinafter be made.

In the drawings, Figure 1 represents a vertical sectional elevation of a portion of a loom embodying my invention; and Figs. 2 and 3, side elevations of the cylinder-motion, drawn to a larger scale.

This double-lift machine has two griffs, one, A, lifting at each odd pick of figuring-weft and serving, with its knives $s$, the hooks $c$, and the needles $a$, for the interweaving of the odd picks of figuring-weft threads and the other griff, A', lifting at each even pick by its knives $s'$, hooks $c'$, and needles $a'$ for the interweaving of the even picks. The arrangement of the knives and hooks shown by the drawings is given by way of example and may be modified by relatively arranging them in any useful manner whatever. Upon each of the cords $i$ there is a balance-weight $r$ under the hole-plate $u$. Each group of the neck-cords $n$ is tied at $o$ and divided into two branches $o'$ $o''$, one of which branches is attached to one of the hooks $c$ and the other branch to one of the hooks $c'$ through the intermediary of the cords $i$ $i$ and the balance-weights $r$ $r$ in such a manner that each group of neck-cords $n$ is controlled for the odd figuring-weft picks by the griff A and for the even picks by the griff A'. The branches $o'$ $o''$ are guided by the bottom hole-plate P and the cords $o$ by the bottom grill G.

The bars V of the upper grill support the returned tails of the hooks, which form springs, and when the griffs are set close together, as shown, a supplementary bar V' is preferably arranged upon the griff A' in such a manner as to prevent the tail of the first hook in A' from touching the last knife in the griff A.

Motion can be given to the griffs and to the cylinder by any of the many known means. The cylinder C beats each of its faces twice consecutively against the needle-plate, this being provided for by means of a mechanical connection between the tail $t'$ of the fork T and a nib $t''$, fixed upon the lifter R of the griff A, Figs. 2 and 3. This will be more fully described farther on.

It will be seen that one single card beating or acting twice for two consecutive picks of figuring-weft realizes an economy of fifty per cent. of the cards employed for a single pattern. The odd figuring-weft will be read upon that part of the cards corresponding with the needles $a$ and the even weft upon the part of the same card corresponding with the needles $a'$.

In this machine, as in the generality of jacquard-machines, the cylinder C is moved away from the needle-plate and makes a quarter-turn, as required. This turning is effected by the action of the known hook terminating the fork T, which hook acts upon the four angle-pivots of the cylinder-lantern. When it is desired to unweave or to reverse the cylinder, it suffices, as is well known, to substitute for the action of the hook T that of the lower hook T' by means generally adopted.

To keep one face of the cylinder in the same plane for two successive strokes, it will suffice, to enable the second weft-thread to pass, to suspend the action of the upper hook T without bringing the lower hook T' into engagement. This result is arrived at in a very simple way and as a consequence of the motion of the two griffs A A' by connecting the end $t'$ of the fork T to a nib $t''$, fixed upon the lifter R of the griff A, either by means of a short cord F or by other equivalent means, such as a chain or wire.

The length of the connection F, or the distance between $t'$ and $t''$, is calculated upon the basis of the amount of travel of the griff.

In Fig. 2 the griff is shown in its highest position, and the cylinder having beaten for the first pick of weft it is necessary for the traversing of the second weft-thread that the lifter R in descending to the bottom should carry with it the cord F, which thus compels the fork T to turn about its pivot $t$. The result is an upward movement of the hook T, which can then no longer act upon the lantern of the cylinder. The hook T' also has then no power to act upon the lantern.

Fig. 2 gives the position of the fork at the first pick of the figuring-weft, and Fig. 3 that of the fork and cylinder at the second pick.

It will be clear that if for any reason it is desired to have the cylinder C beat for each pick of the figuring-weft and to apply different cards against the needles $a$ and $a'$, respectively, it will suffice to suppress the cord F. In this case the odd cards will be read only for the parts corresponding to the needles $a$ and the even cards for the needles $a'$.

There result from the hereinbefore-described arrangements an increase of speed, a smoother motion for the harness, and a facility for crossing the warp-threads, inasmuch as one group of neck-cords $n$, arranged to lift for several consecutive figuring-picks, is found at the middle of its descent and is there engaged by the other griff without shaking and with only then one-half of the lift to complete. The proper motion of each griff is, moreover, made slower, notwithstanding the increase in the speed of work, inasmuch as it acts only at alternate picks of figuring-weft. The less abrupt movement permits the work to be accelerated without unduly wearing the harness and the warp.

In the drawings the two griffs are represented at mid-stroke and, for the sake of clearness, with only six knives each and with only one hook to each knife. It will, however, be evident that any necessary number of knives and hooks may be employed.

Having now particularly described and ascertained the nature of my said invention, I declare that what I claim is—

1. In a double-lift jacquard-machine, the combination with the griff-lifters, of a pattern-cylinder, means controlled by the pattern-cylinder and operated by the griffs for lifting the warp-threads, a cylinder-fork, and means for connecting said fork with one of the griff-lifters, whereby each card by two successive beats of the cylinder controls the lifting of the warp-threads for interweaving two consecutive picks of figuring-weft, substantially as described.

2. In a jacquard-machine having two lifters, the combination with the cylinder, of a cylinder-fork provided with a tail, and connections between said tail and one of the lifters adapted to operate upon said tail and fork upon a movement of the lifter in one direction only, substantially as described.

3. In a jacquard-machine, having two lifters, the combination with the cylinder, of a cylinder-fork provided with a tail, and flexible connections between said tail and one of the lifters, substantially as described.

4. In a jacquard-machine, the combination with two griff-lifters R R', of a cylinder C, a double hook or cylinder-fork T T', provided with a tail $t'$, a nib $t''$ on one of said lifters, and a cord F connecting said tail and nib, substantially as described.

In testimony whereof I have affixed my signature in presence of two witnesses.

HENRY GLORIEUX.

Witnesses:
EMILE GAILLET,
E. FEMING.